United States Patent
Bensch et al.

(10) Patent No.: US 8,297,712 B2
(45) Date of Patent: Oct. 30, 2012

(54) VALVE UNIT FOR AN ELECTRO-PNEUMATIC BRAKE CONTROL DEVICE

(75) Inventors: Uwe Bensch, Hannover (DE); Jörg Helmer, Vogt (DE); Bernd-Joachim Kiel, Wunstorf (DE); Hartmut Rosendahl, Hannover (DE); Otmar Struwe, Hannover (DE)

(73) Assignee: WABCO GmbH, Hannover (DE)

( * ) Notice: Subject to any disclaimer, the term of this patent is extended or adjusted under 35 U.S.C. 154(b) by 553 days.

(21) Appl. No.: 12/310,177

(22) PCT Filed: Jul. 4, 2007

(86) PCT No.: PCT/EP2007/005911
§ 371 (c)(1),
(2), (4) Date: Nov. 11, 2009

(87) PCT Pub. No.: WO2008/025401
PCT Pub. Date: Mar. 6, 2008

(65) Prior Publication Data
US 2010/0078988 A1   Apr. 1, 2010

(30) Foreign Application Priority Data
Aug. 31, 2006  (DE) .......................... 10 2006 041 011

(51) Int. Cl.
*B60T 13/74*   (2006.01)

(52) U.S. Cl. ................. 303/3; 303/9.66; 303/20
(58) Field of Classification Search ................. 303/3, 4, 303/7, 9.66, 20, 89
See application file for complete search history.

(56) References Cited

U.S. PATENT DOCUMENTS

| | | | | |
|---|---|---|---|---|
| 5,042,883 A | * | 8/1991 | McCann et al. | 303/7 |
| 6,729,696 B2 | * | 5/2004 | Kemer et al. | 303/7 |
| 2003/0006644 A1 | | 1/2003 | MacGregor et al. | |
| 2005/0029859 A1 | | 2/2005 | Bensch et al. | |
| 2006/0207822 A1 | * | 9/2006 | Taylor | 180/326 |

FOREIGN PATENT DOCUMENTS

| | | |
|---|---|---|
| DE | 102 51 249 A1 | 12/2003 |
| DE | 103 36 611 A1 | 3/2005 |
| EP | 1 733 943 A | 12/2006 |
| GB | 2 310 017 A | 8/1997 |
| GB | 2 349 675 A | 11/2000 |

\* cited by examiner

*Primary Examiner* — Pamela Rodriguez
(74) *Attorney, Agent, or Firm* — Kramer Levin Naftalis & Frankel LLP

(57) ABSTRACT

A valve unit for an electro-pneumatic brake control device for controlling a parking brake of a vehicle includes at least one air-quantity-boosting valve device for aerating and venting at least one spring brake cylinder of the parking brake and at least one electrically actuatable control valve for controlling the air-quantity-boosting valve device. To simplify the construction of the brake control device, the air-quantity-boosting valve device and the control valve are integrated in a common integral valve block.

14 Claims, 8 Drawing Sheets

VALVE UNIT FOR AN ELECTRO-PNEUMATIC BRAKE CONTROL DEVICE

FIELD OF THE INVENTION

The present invention generally relates to embodiments of a valve unit for an electro-pneumatic brake control device for controlling a vehicle parking brake.

BACKGROUND OF THE INVENTION

DE 103 36 611 A1 describes a known valve unit of the general type under consideration. In this known valve unit, a parking brake module is provided in which there are integrated an electronic control device as well as a valve device that can be electrically actuated by the electronic control device. This parking brake module comprises an electronics module and a valve module, in which a plurality of valves is structurally integrated. This construction provides a compact parking brake module that can be easily integrated into known air-brake systems.

SUMMARY OF THE INVENTION

Generally speaking, it is an object of the present invention to further develop and improve upon such known valve units, and, in particular, to reduce the time and effort for installation and the manufacturing costs of a valve unit for an electro-pneumatic brake control device for a parking brake.

Advantageously, according to embodiments of the present invention, by the use of a common uniform valve block for the air-flow-boosting valve device as well as at least one control valve, the time and effort for assembling the valve unit as well as the subsequent time and effort for installing the valve unit in the vehicle can be kept to a minimum. For this purpose, the valve block according to embodiments of the invention, is manufactured from a uniform metal block, especially a light-metal block, or from a plastic block having recesses for the air-flow-boosting valve device and the control valve or valves. The valve block forms a common housing for both this valve device and the control valve or valves. Thus, no separate housing components for the valve device and the control valve or valves are present. In this way, the movable components of the valves can be inserted in simple manner into the valve block, and, so, the valve block takes over the function of housing parts of the valve device or of the control valve or valves. For example, the valve block having the recesses provided for this purpose constitutes guides for the movable parts of the valve device or of the control valve or valves.

Preferably, the valve block has one or more installation locations for pressure sensors to be disposed therein. Advantageously, a pressure sensor is provided by means of which the reservoir pressure of a compressed air accumulator can be sensed. This pressure sensor is disposed such that, in the case of a plurality of compressed air accumulators, the higher reservoir pressure of the two compressed air accumulators can be sensed.

The valve unit is preferably connected to an electrical control device, by means of which at least one control valve can be actuated in controlled manner. This control device is connected to an electrical actuating device, which has at least one electrical switch with a released position and an engaged position and, possibly, a neutral position, for release or engagement of the parking brake. The reservoir pressure sensed by means of the pressure sensor and the switch condition or conditions is read in and evaluated by the control device and, after appropriate logical combination, the control valve(s) is(are) operated such that the air-flow-boosting valve device is switched to admit air to a spring-actuator part of a spring-actuated brake cylinder and, thus, release the parking brake of the vehicle, or such that it vents this spring-actuator part to engage the parking brake. The control valve(s) is(are) preferably designed such that the air-flow-boosting valve device switches to a venting position in the de-energized condition of the control valve(s) in order to vent the spring-actuator part of the spring-actuated brake cylinders and, thus, engage the parking brake.

The pressure sensor(s) is(are) advantageously integrated in a cover of the valve unit, which cover can be mounted on the valve block in order to seal it. Preferably, the cover has a plurality of installation locations for pressure sensors, and either all or only some of the installation locations are equipped with pressure sensors.

The control device is preferably integrated in a unit, disposed spatially separated from the valve unit, for control of an anti-lock braking system. As a result, the evaluation logic can be integrated into a control device that, in many cases, is already present, whereby the complexity of control electronics can be kept small.

Alternatively, the valve unit can be provided with its own control device, which, advantageously, can be disposed in the cover of the valve unit.

Preferably, the valve block has at least two installation locations for solenoids of control valves even when only one solenoid is provided for the valve unit. In this case, a first installation location is provided for a first solenoid of an electrically actuatable control valve, which can actuate the parking brake of a tractor. A second installation location is provided for a second solenoid of a further electrically actuatable control valve, which can actuate the parking brake of a trailer. By the provision of two or more installation locations, therefore, the valve unit can be used both for vehicles without trailers and for vehicles with a trailer. By providing a plurality of installation locations for solenoids of control valves, it is, therefore, possible to use a uniform valve block regardless of how many control valves are actually installed in the valve unit. The valve block is, therefore, universally usable, especially in different vehicle configurations and in markets with different technical or legal regulations. As a result, lower manufacturing costs and also simpler warehousing can be realized by virtue of larger production runs. If only one of two or only some of a plurality of installation locations for solenoids is/are occupied, the second installation location remains or the rest of the installation locations remain unoccupied.

Advantageously, the valve block has one or more ports, which can be placed in communication with one or more compressed air accumulators via compressed air lines. In vehicles used in the European market, the compressed air supply usually is effected via its own brake circuit, namely, that known as circuit III, with a separate compressed air reservoir tank, whereas, in vehicles used in the North American market, the compressed air supply is effected via brake circuits I and II, which are designed for the service brake of the rear or front axle of the vehicle. Thus, two compressed air supply ports are provided and used for the North American market, whereas, for the European market, only one of the two compressed air supply ports provided is actually in communication with a compressed air accumulator. Therefore, at least one of the plurality of ports for compressed air lines to compressed air accumulators remains closed.

Preferably, at least one pressure sensor is disposed in a compressed air duct, which is provided in the valve block and leads from the output of the air-flow-boosting valve device in the direction of the spring-actuated brake cylinder of the parking brake. Thus, the pressure can also be sensed downstream from the air-flow-boosting valve device and the sensed value can be evaluated in the control device and used for control of the control valves. For this purpose, the valve block is provided with a plurality of installation locations for pressure sensors, even when the number of sensors installed is smaller than the number of available installation locations. Thus, the same valve block can be used for different vehicle configurations and markets.

Still other objects and advantages of the present invention will in part be obvious and will in part be apparent from the specification.

The present invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
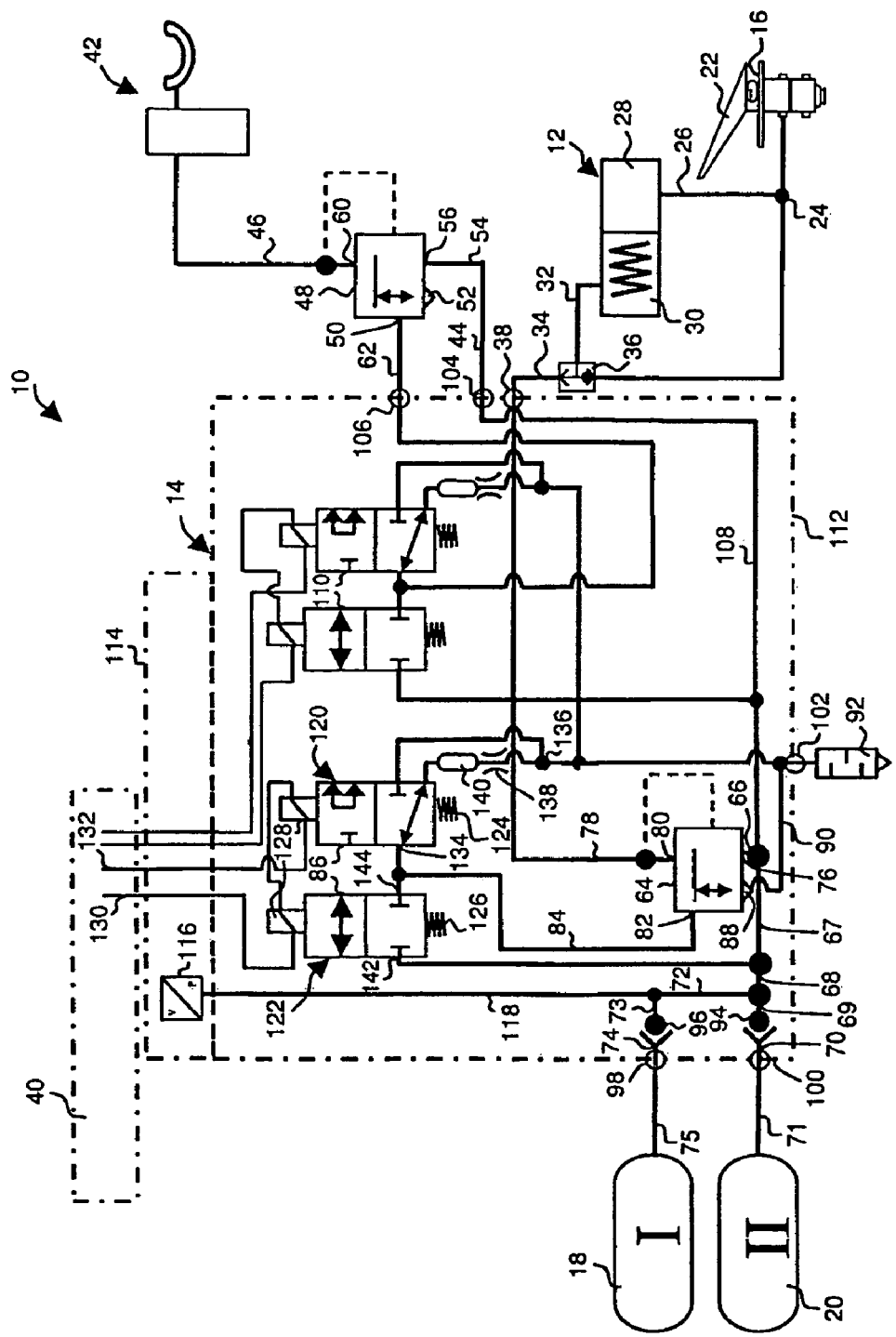
FIG. 1 is a simplified schematic diagram of a section of an air-brake system having an electro-pneumatic brake control device for controlling a parking brake, including a valve unit according to an exemplary embodiment of the present invention.

Referring now to the drawings, FIG. 1 schematically shows a part of an air-brake system 10 for a vehicle, in particular an electro-pneumatic brake control device for controlling a parking brake of the vehicle. Such air-brake systems are used, for example, in commercial vehicles, heavy motor trucks or buses. Such brake systems are also used in particular in vehicle trains comprising a tractor and a trailer.

FIG. 1 shows only certain components of brake system 10. Brake system 10 is electrically controllable. This means that the metering of pressure to brake cylinders for actuation of wheel brakes provided on the vehicle wheels is controlled by electrical or electronic control elements. In a first type of brake system, the service brake is pneumatically actuated, although, in the event of locking of a wheel, an electronic anti-lock braking system releases the associated brake by shutting off the supplied brake pressure. Such systems are found in particular in the North American market. In another type of brake system, the service brake is electro-pneumatically actuated, as electrical signals from a brake pedal are evaluated in a controller and further electrical signals control the pressure supply to the brake cylinders by means of electrical actuatable valves. Such systems are found in particular in the European market.

The brake cylinders are designed partly or completely as combination service and spring-actuated brake cylinders 12 (for simplicity, only one such brake cylinder is illustrated in FIG. 1), the spring-actuator part being controlled by an electro-pneumatic brake control device designed as parking brake valve unit 14 for controlling the parking brake.

Brake system 10 is provided with a brake-actuating device 16, which senses braking intent of the vehicle operator. Via compressed air lines (not illustrated), a pneumatically operated portion of brake-actuating device 16 is supplied with compressed air from a first compressed air reservoir tank 16 (circuit I) and a second compressed air reservoir tank 20 (circuit II). Compressed air reservoir tanks 18, 20 are used to supply compressed air to the brake cylinders of the service brakes, as will be discussed in greater detail hereinafter on the basis of FIG. 2. As illustrated in FIG. 1, however, they can also be used to supply compressed air to the parking brake. Alternatively, the compressed air for the parking brake is supplied by a separate compressed air reservoir tank (circuit III), as is illustrated in FIGS. 5 to 8.

By actuation of a brake pedal 22, brake-actuating device 16 generates a pneumatic manipulated variable, which is relayed via a compressed air line 24, 26 to combination service and spring-actuated brake cylinder 12. Alternatively or additionally, brake-actuating device 16 generates an electrical manipulated variable for electrical activation of electro-pneumatic devices, in order to control or regulate the pressure to brake cylinder 12.

According to an embodiment of the present invention, combination service and spring-actuated brake cylinder 12 is designed as a combination spring-actuator/diaphragm cylinder. Besides the function of a diaphragm cylinder, it additionally has a spring-actuator function. Brake cylinder 12 is therefore provided with a diaphragm part 28, which is in communication pneumatically with the service brake system and can be pressurized with the actual brake pressure, and with a spring-actuator part 30, which is pneumatically separated from diaphragm part 28 and can be pressurized with compressed air via separate compressed air lines 32, 34. Spring-actuator part 30 forms part of the parking brake. It includes the spring-actuator function, which preloads an actuator spring upon pressurization of spring-actuator part 30 and, thus, prevents or diminishes braking action of the spring-actuator function, whereas the actuator spring relaxes upon venting of spring-actuator part 30 and, thus, in connection with the spring-actuator function, exerts a braking action on the brake in communication with the respective brake cylinder. In the present application, brake cylinders of this type will be referred to as spring-actuated brake cylinders.

To prevent mechanical overloading of the brake mechanism, overload protection is provided in the form of an overload-protection valve 36 (for example, a valve known as a select-high valve), which is connected between spring-actuator part 30, a pneumatic output 38 of the parking brake valve unit 14 and brake-actuating device 16. Overload-protection valve 36 selects the higher of two pressures present at its inputs leading to brake-actuating device 16 or to output 38 of parking brake valve unit 14. Overload-protection valve 36 supplies the higher of the two pressures via its output to spring-actuator part 30 of brake cylinder 12. Overload-protection valve 36 prevents addition of the brake force exerted by the service brake and the brake force exerted by the parking brake, so that, in this way, it prevents mechanical overloading of the brake mechanism in the wheel brake associated with brake cylinder 12.

By means of spring-actuated brake cylinder 12, a parking brake function is achieved that also permits the vehicle to be braked or immobilized even in the absence of compressed air. The parking brake function is active when the respective spring-actuator part 30 of spring-actuated brake cylinder 12 is vented below a minimum pressure value or is vented completely. Via compressed air lines 32, 34, spring-actuator part 30 of brake cylinder 12 is pneumatically in communication with parking brake valve unit 14, which permits pressure control by way of electronic control means.

A manually actuatable parking brake signal transducer (not illustrated in FIG. 1) is electrically connected via an electrical line (not illustrated) to an electronic control unit 40.

The vehicle can be designed for coupling a trailer having a further parking brake equipped with spring-actuated brake cylinders. Brake system 10 is therefore provided with what is known as a tractor-truck protection valve 42, which is used for brake pressure control, especially, of the parking brake of the trailer. Via compressed air lines 44, 46, tractor-truck protection valve 42 is supplied with the reservoir pressure of compressed air reservoir tanks 18, 20. Furthermore, a pressure modulated by means of an air-flow-boosting valve device, namely a relay valve 48, and intended for the parking brake of the trailer is supplied to tractor-truck protection valve 42.

Relay valve 48 is provided with a control input 50, a vent port 52 that can be placed indirectly or directly in communication with atmosphere and an inlet 56 that, via a compressed air line 54, can be placed in communication with the reservoir pressure of compressed air reservoir tanks 18, 20 as well as an outlet 60 that, via compressed air line 46, can be placed in communication with tractor-truck protection valve 42. Control input 50 is in communication with parking brake valve unit 14 via a compressed air line 62.

At its outlet 60, relay valve 48 delivers to compressed air line 46 an output pressure that corresponds to the pressure injected via compressed air line 62 at control input 50 and, thus, to the pressure in a control chamber of relay valve 48. Relay valve 48 draws the compressed air needed for this purpose from compressed air supply line 54, which is in communication with inlet 56 of relay valve 48 and via further compressed air lines is in communication with compressed air reservoir tanks 18, 20.

Parking brake valve unit 14 is provided with an air-flow-boosting valve device in the form of a relay valve 64 for the tractor. Relay valve 64 comprises an inlet 76 in direct or indirect communication via compressed air lines 66 to 75 with compressed air reservoir tanks 18, 20. Furthermore, relay valve 64 is provided with an outlet 80 in communication via compressed air lines 78, 34, 32 with spring-actuator part 30 of brake cylinder 12. Furthermore, relay valve 64 has a control input 82, which is in communication via a compressed air line 84 with a control valve 86 for control of the parking brake of the tractor vehicle.

At its outlet 80, relay valve 64 delivers to compressed air line 78 an output pressure that corresponds to the pressure injected via compressed air line 64 at control input 82 and, thus, to the pressure in a control chamber of relay valve 64. Relay valve 64 draws the compressed air needed for this purpose from compressed air supply line 66, which is in communication with inlet 76 of relay valve 64. Any venting of compressed air line 78 that may be necessary takes place via a vent port 88 in indirect or direct communication with atmosphere. In the exemplary embodiment shown in FIG. 1, vent port 88 is in communication via a compressed air line 90 with a venting device 92.

Parking brake valve unit 14 is further provided with check valves 94, 96 connected upstream from compressed air reservoir tanks 18, 20, respectively, which valves, in the event of a pressure drop or of detachment of or damage to compressed air lines 71 and 75, respectively, to compressed air reservoir tanks 20 and 18, respectively, prevent a pressure loss from occurring in parking brake valve unit 14. Such a pressure drop or pressure loss is undesirable, since it could lead, in particular, to sudden engagement of the parking brake and, thus, to emergency braking of the tractor. Under certain circumstances, this can cause an uncontrollable driving situation. Furthermore, in the event of failure of one brake circuit, the other brake circuit would also be vented at the same time. This is hazardous, however, and therefore undesirable.

Parking brake valve unit 14 is provided with a plurality of pneumatic ports 98, 100, 102, 104, 106. Via port 98, compressed air line 74 is in communication with compressed air line 75 for connection of first compressed air reservoir tank 18. Via port 100, compressed air line 70 is in communication with compressed air line 71 for connection of second compressed air reservoir tank 20. Via port 102, compressed air line 90 is in communication with venting device 92. Via port 104, compressed air line 44 to relay valve 48 for the trailer controller is in communication with compressed air line 108 and, thus, via compressed air lines 67-75, is in communication with compressed air reservoir tanks 18, 20. Via port 106, compressed air line 62 to control input 50 of relay valve 48 for the trailer controller is in communication with a control valve 110 disposed in parking brake valve unit 14 for control of the trailer parking brake.

Parking brake valve unit 14 comprises a valve block 112 and a cover 114 for valve block 112. Control valves 86, 110, relay valve 64 and also the diverse compressed air lines shown in the form of compressed air ducts within valve block 112 are integrated in valve block 112. In particular, the compressed air ducts are designed in the form of bores or recesses in valve block 112. In connection with the present application, the term "compressed air line" will be understood to comprise any kind of device for guiding or conducting compressed air.

Valve block 112 forms a common, one-piece, integral housing for control valves 86, 110 and relay valve 64, so that only the parts that are usually disposed internally in such valves are inserted into valve block 112. Therefore, within valve block 112, a plurality of locations is already provided for such control valves 86, 110 or relay valves 64, which locations are equipped or left unoccupied depending on the configuration of parking brake valve unit 14.

Parking brake valve unit 14 is further provided with a pressure sensor 116, which is mounted within cover 114 and is used for monitoring the reservoir pressure inside parking brake valve unit 14. For this purpose, pressure sensor 116 is in communication, via a compressed air line 118 or a corresponding compressed air duct, with compressed air line 72 and, thus, is directly or indirectly in communication with compressed air lines 66-71, 73-75 as well as 108, 44 and 46. By means of this pressure sensor 116, at least the higher of the two reservoir pressures of compressed air reservoir tanks 18, 20 can be sensed. In an alternative embodiment, a plurality of pressure sensors is disposed such that each of the two reservoir pressures of compressed air reservoir tanks 18, 20 can be sensed separately. Valve unit 14 is, therefore, provided alternatively with a plurality of compressed air lines or compressed air ducts to a plurality of pressure-sensor locations, which are equipped either completely or partly with pressure sensors.

Figure 5:
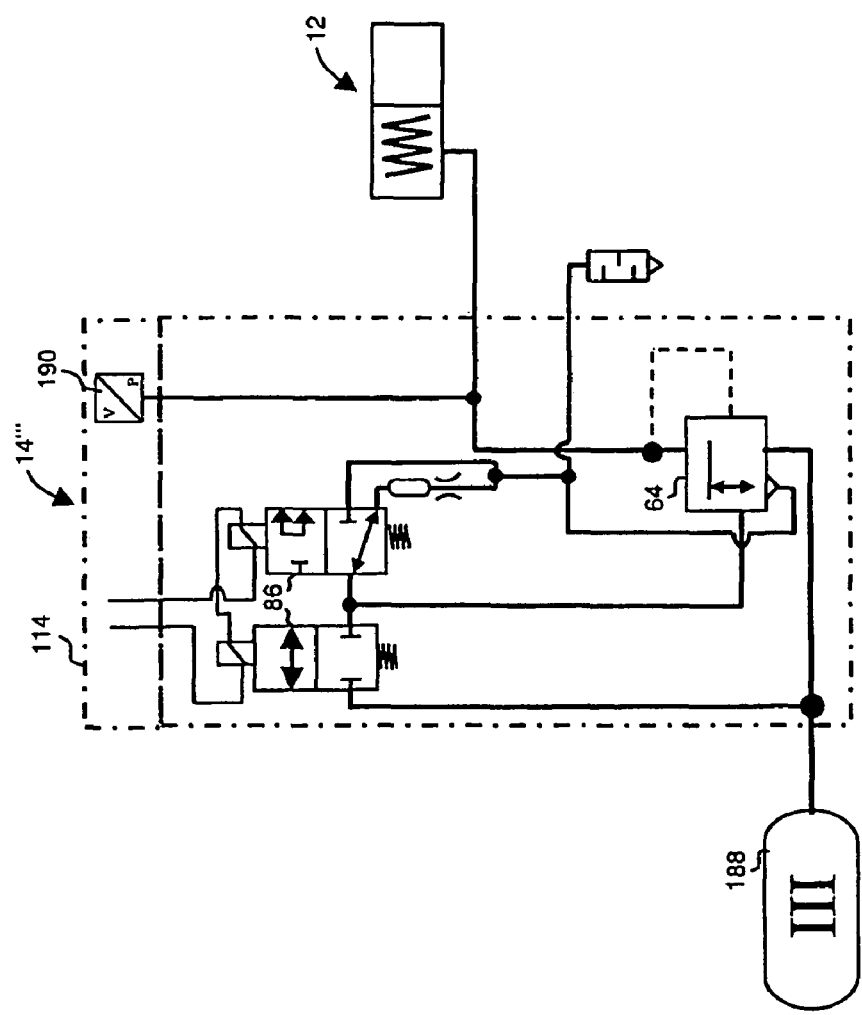
FIG. 5 is a simplified schematic diagram of a section of an air-brake system having an electro-pneumatic brake control device for controlling a parking brake, including a valve unit according to another exemplary embodiment of the present invention for use in commercial vehicles for the European market with electronic brake systems.
Figure 7:
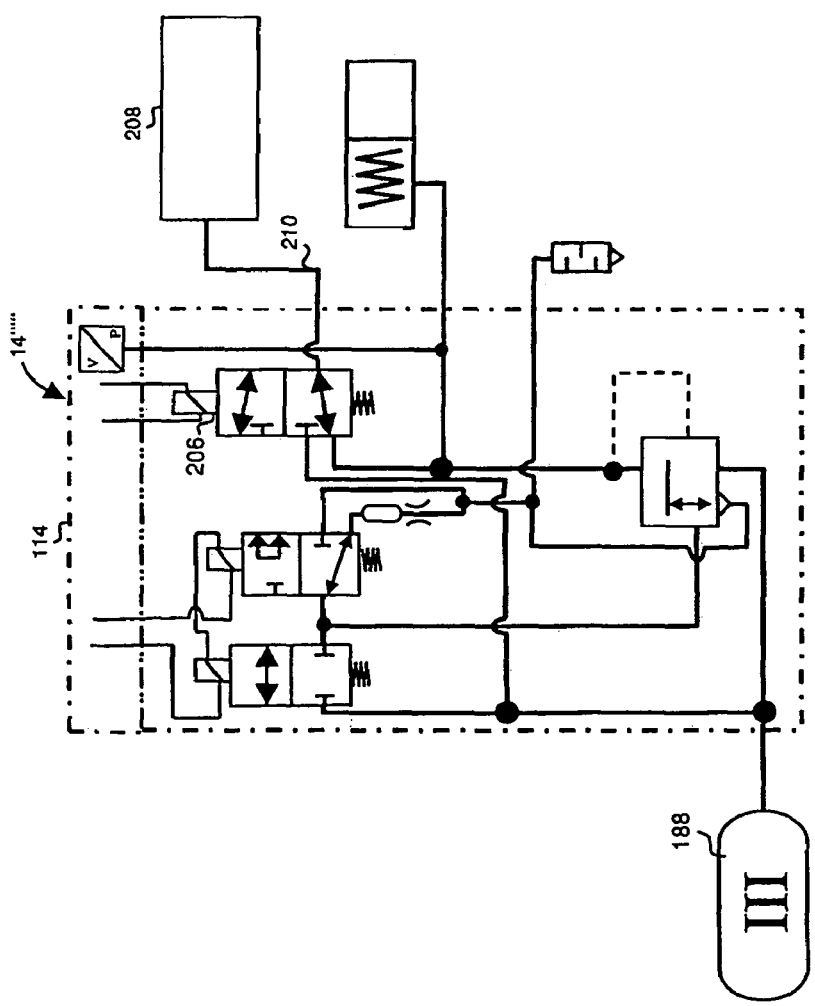
FIG. 7 is a simplified schematic diagram of a section of an air-brake system having an electro-pneumatic brake control device for controlling a parking brake, including a valve unit according to a still further exemplary embodiment of the present invention for use in commercial vehicles for the European market with trailers and electronic brake systems.

In the exemplary embodiment illustrated in FIG. 1, electronic control unit 40 is disposed outside parking brake valve unit 14 in a separate control unit, which can be the control unit of an anti-lock braking system. Alternatively, however, control unit 40 can also be disposed inside parking brake valve unit 14, especially, in cover 114. For this purpose, the parking brake valve unit has a recess that accommodates control unit 40 in the valve block and/or cover. Corresponding exemplary embodiments are illustrated in FIGS. 5 and 7.

By means of electronic control unit 40, the states of the control valves are determined in a manner depending on the signals of the actuating device and, possibly, of the pressure sensors, and supplied to control valves 86, 110, which then assume the corresponding valve positions.

Control valves 86 and 110 are preferably of identical design. Hereinafter, the discussion will, therefore, be confined to control valve 86, since the discussion in this regard similarly applies to control valve 110.

Control valves 86 and 110 are designed as components integrated in valve block 112. This means that the housings of control valves 86, 110 are formed by valve block 112. Likewise, relay valve 64 is designed to be integrated in valve block 112. This means that the housing of relay valve 64 is formed by valve block 112. Control valve 86 is preferably designed as a double-armature solenoid valve. This double-armature solenoid valve is provided with two magnet armatures 120, 122 disposed in an armature-guide arrangement formed by valve block 112. A first magnet armature, namely, primary armature 120, is loaded by means of a spring 124 and is compressed by this spring into the position illustrated in FIG. 1. Analogously, a second magnet armature, namely, secondary armature 122, is loaded with a spring 126 and is compressed into the position illustrated in FIG. 1. Both magnet armatures 120, 122 are partly surrounded by a solenoid 128.

In FIG. 1, solenoid 128 is shown in two pieces. Nevertheless, it is a single coil, by means of which both primary armature 120 and secondary armature 122 can be actuated. Upon injection of suitable solenoid currents into solenoid 128, solenoid 128 first pulls primary armature 120 in the direction of the interior of the coil and, at a higher solenoid current, may additionally pull secondary armature 122 in the direction of the interior of the coil. In this way, primary armature 120 and, possibly, also secondary armature 122 is brought into its switched position. Primary armature 120 is provided as an operating element for a vent valve, and secondary armature 122 is provided as an operating element for an air-admission valve. Solenoid 128 is provided with two electrical ports 130, 132, which are connected to electronic control unit 40.

When solenoid 128 is de-energized, both primary armature 120 and secondary armature 122 are located in their home positions, determined by springs 124, 126, as illustrated in FIG. 1. In its home position, the air-admission valve shuts off the reservoir pressure from compressed air reservoir tanks 18 and 20, respectively, from control input 82 of relay valve 64. In its home position, the vent valve places its inlet 134 in communication with its outlet 136 via an interposed orifice 138 acting as a throttle. A compressed air accumulator 140 is provided between orifice 138 and primary armature 120. This compressed air accumulator 140 is preferably designed as a chamber within control valve 86.

Inlet 134 of the vent valve is in communication with the outlet of the air-admission valve as well as control input 82 of relay valve 64.

In the home position of primary armature 120, inlet 134 is pneumatically in communication with outlet 136 via orifice 138. In the switched position of primary armature 120 (for example, when the primary armature has been pulled inward in the direction of the interior of solenoid 128 by injection of a first solenoid current of predetermined magnitude), compressed air accumulator 140 is pneumatically in communication with outlet 136 directly, or, in other words, without interposition of orifice 138, and inlet 134 is shut off from outlet 136.

Air-admission valve 122 is provided with an inlet 142 that can be placed in communication with the reservoir pressure of reservoir tank 18 or 20. The outlet of air-admission valve 144 is further in pneumatic communication via corresponding ducts of control valve 86, with inlet 134 of the vent valve.

In its home position, secondary armature 122 of the air-admission valve shuts off inlet 142 from outlet 144 of the air-admission valve. In its switched position, secondary armature 122 places inlet 142 in communication with outlet 144.

By virtue of the described arrangement, the vent valve forms a 3/2-way solenoid valve. In contrast, the air-admission valve forms a 2/2-way solenoid valve.

The design of control valve 86 as a double-armature valve having an orifice for slow venting, provides a valve unit of simple and, therefore, inexpensive design that simultaneously ensures safe parking of the vehicle even in the event of failure of the electrical power supply. By injection of a high solenoid current, air can be admitted to the relay valve and, thus, to the spring-actuator part of the spring-actuated brake cylinders. By injection of a low current, the pressure can be held at the control input of the relay valve and, thus, also in the spring-actuator part of the spring-actuated brake cylinder. In the case of a pulsed low current at control valve 86, primary armature 120 is moved to and fro at an adjustable speed corresponding to the pulse frequency, thus permitting rapid venting of control input 82 of relay valve 64 and, thus, of the spring-actuator part of the spring-actuated brake cylinders. In the de-energized condition, on the other hand, only slow venting of control input 82 or of the control chamber of relay valve 64 takes place via orifice 138.

It should be appreciated that, according to exemplary embodiments of the present invention, a simple implementation of a parking brake is achieved, which ensures a safe condition even in the event of failure of the electrical power supply and which, in addition, can be actuated by purely electrical means. In particular, the pneumatic tubing commonly disposed in the vehicle operator's cab for the purpose of activating the parking brake can be omitted, and operator control of the parking brake can be achieved completely via an electrical actuating means. This is the case both for the parking brake of the tractor and for the parking brake of the trailer.

Instead of the arrangement for control valve 86 discussed above, it is also possible as an alternative to use a different valve arrangement, in which air can be admitted to control input 82 of relay valve 64, or the input can be vented, or the pressure at control input 82 of relay valve 64 can be held. Advantageously, but not necessarily, slow venting of control input 82 is provided for this purpose, especially in the case of failure of the electrical power supply.

As discussed above, control valve 110 for controlling the parking brake of the trailer is designed like control valve 86. Accordingly, parking brake valve unit 14 is provided with corresponding installation locations for these valves, which locations are equipped as needed. On the whole, the integration of all components in a common valve block permits simplification of the overall construction, since the individual valve housings can be omitted and common valve block 112 forms an integral housing and a retaining or bearing device for the valve components.

Figure 2:
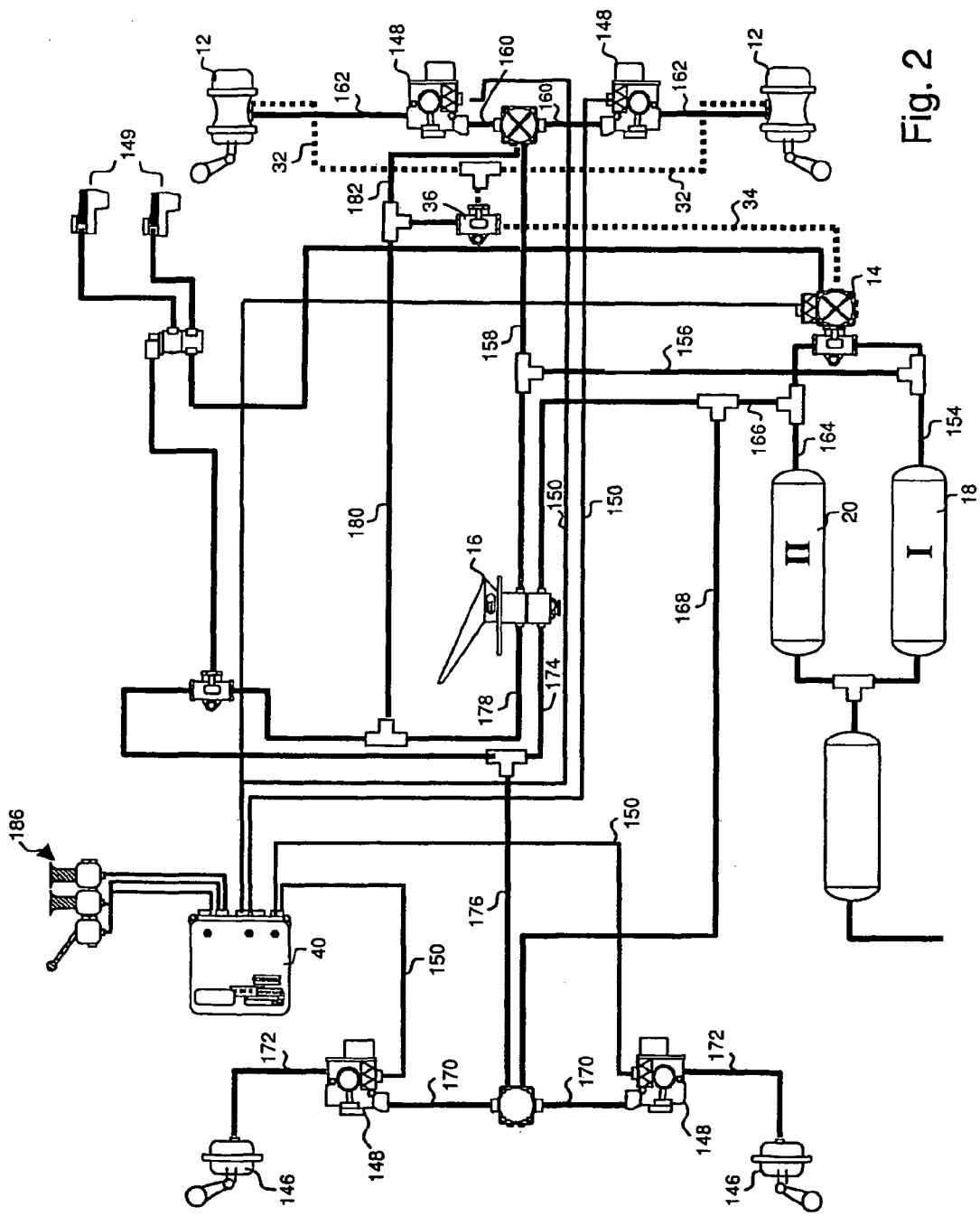
FIG. 2 is a schematic diagram of an air-brake system having the components of the brake system shown in FIG. 1 as well as further components in accordance with an embodiment of the present invention.

FIG. 2 shows the subsystem of the brake system illustrated in FIG. 1 in a broader context, specifically for a four-wheeled vehicle. This vehicle has four wheels, which can be individually braked by means of compressed air brake cylinders 12, 146. Brake cylinders 12 are provided for the rear axle, and brake cylinders 146 for the front axle. As discussed in connection with FIG. 1, brake cylinders 12 are designed as combination service brake/spring-actuated brake cylinders, in order to permit braking by means of the service brake and also braking by means of the parking brake. Electrically actuatable valves 148 are connected upstream from brake cylinders 12, 146, respectively, to create an anti-lock braking system, which lowers the supplied brake pressure in the event of locking of a given wheel. Valves 148 are connected via electrical lines 150 to control unit 40. Furthermore, the valves are in communication via pneumatic lines with compressed air accumulators 18, 20. Valves 148 of the rear axle are in communication via compressed air lines 154, 156, 158, 160 with compressed air reservoir tank 18, forming what is known as circuit I. Analogously, valves 148 of the front axle are in communication via compressed air lines 164, 166, 168, 170, 172 with the second compressed air reservoir tank, forming what is known as circuit II.

By means of pneumatic lines, namely compressed air lines 174, 176, and then further via compressed air lines 170, 172, brake-actuating device 16 is in communication with compressed air brake cylinders 146 of the front axle, in order to complete the pneumatically operating brake circuit II of the service brake. Analogously, brake-actuating device 16 is in communication via compressed air lines 178, 180, 182 and further via compressed air lines 160, 162 with combination service and spring-actuated brake cylinder 12, in order to complete the pneumatically operating brake circuit I of the service brake.

Parking brake valve unit 14 illustrated in FIG. 1 is shown as an integrated component in FIG. 2. Via compressed air line 34 discussed above in connection with FIG. 1, parking brake valve unit 14 is in communication with overload-protection valve 36, which is used to prevent overloading of combination service and spring-actuated brake cylinders 12 in the event of simultaneous loading by means of the force of the actuator springs and, possibly, the additional service brake pressure. Via compressed air lines 32, overload protection 36 is pneumatically in communication with spring-actuated brake cylinders 12.

Also provided in the construction depicted in FIG. 2 is a compressed air port 149 for actuation of the service brake or of the parking brake of a trailer that may be present.

FIG. 2 further shows an electrical actuating device 186 for actuating the parking brake. Depending on the vehicle configuration, this actuating device is provided with one or two electrical switches with released, engaged and neutral positions for releasing or engaging the parking brake. Furthermore, in an embodiment for vehicles with trailers, there is provided an additional electrical operator-control element so that the trailer can be braked separately by means of the parking brake. An anti jackknifing function can be achieved by means of this additional operator-control element. By actuating the anti jackknifing brake function, the vehicle operator is able to maintain the vehicle train stretched out during braking on a smooth roadway by braking only the rear wheels, or, in other words, those of the trailer/semitrailer. By means of the additional operator-control element, the operator is also able to test whether a stationary trailer is actually being braked, by actuating this operator-control element and exerting a tractive force on the trailer by means of the tractor. Furthermore, by means of the anti jackknifing brake, the driver is also able to check secure closing of the connection between tractor and trailer, especially semitrailer, or, in other words, the articulated coupling.

In the embodiment of the present invention depicted in FIG. 2, the controller of the electro-pneumatic parking brake is integrated in the control unit of an anti-lock braking system. Pressure sensor 116 provided in parking brake valve unit 14 preferably senses the higher of the two reservoir pressures of compressed air reservoir tanks 18, 20. The sensed pressure value as well as the switch conditions of electrical actuating device 186 are read in and evaluated by control unit 40. Control valves 86, 110 are appropriately switched in a manner depending on the result of the corresponding logical combinations. When the control valves are energized, relay valves 64 and 48 can be displaced to their switched position, thus causing air to be admitted to the spring actuators, so that the parking brake is released. However, when the control valves are switched to de-energized condition, relay valve 64 or 48 switches to venting and the spring actuators are engaged, or, in other words, the spring-actuated brake cylinders engage the parking brake.

Valve unit 14 discussed above comprises a relay valve 64 for the tractor, a control valve 86 for the tractor and, if necessary, also a control valve 110 for a trailer. Relay valve 64 and associated control valve 86 of the tractor are integrated in valve block 112. Likewise a pressure sensor is integrated in cover 114 of valve unit 14. Optionally, second relay valve 48 for the trailer can be installed externally. Overload-protection valve 36 is mounted in the valve unit or externally.

FIGS. 3 to 8 show further exemplary embodiments of parking brake valve units in different configurations for different markets. Just as the exemplary embodiments shown in FIGS. 1 and 2, the brake systems of FIGS. 3 and 4 relate to the North American market. They are characterized by the parking brake valve unit being supplied with compressed air from the compressed air reservoir tanks of brake circuits I and II, meaning that the service brake circuits for the rear axle and the front axle are supplied with compressed air. In contrast, the exemplary embodiments according to FIGS. 5 to 8 are provided with their own compressed air supply for the parking brake and, therefore, with their own brake circuit for the parking brake, namely, circuit III.

FIGS. 3 to 8 correspond largely to FIG. 1. Hereinafter, therefore, only the differences from FIG. 1 will be discussed, while the foregoing discussion can be consulted for other information.

Figure 3:
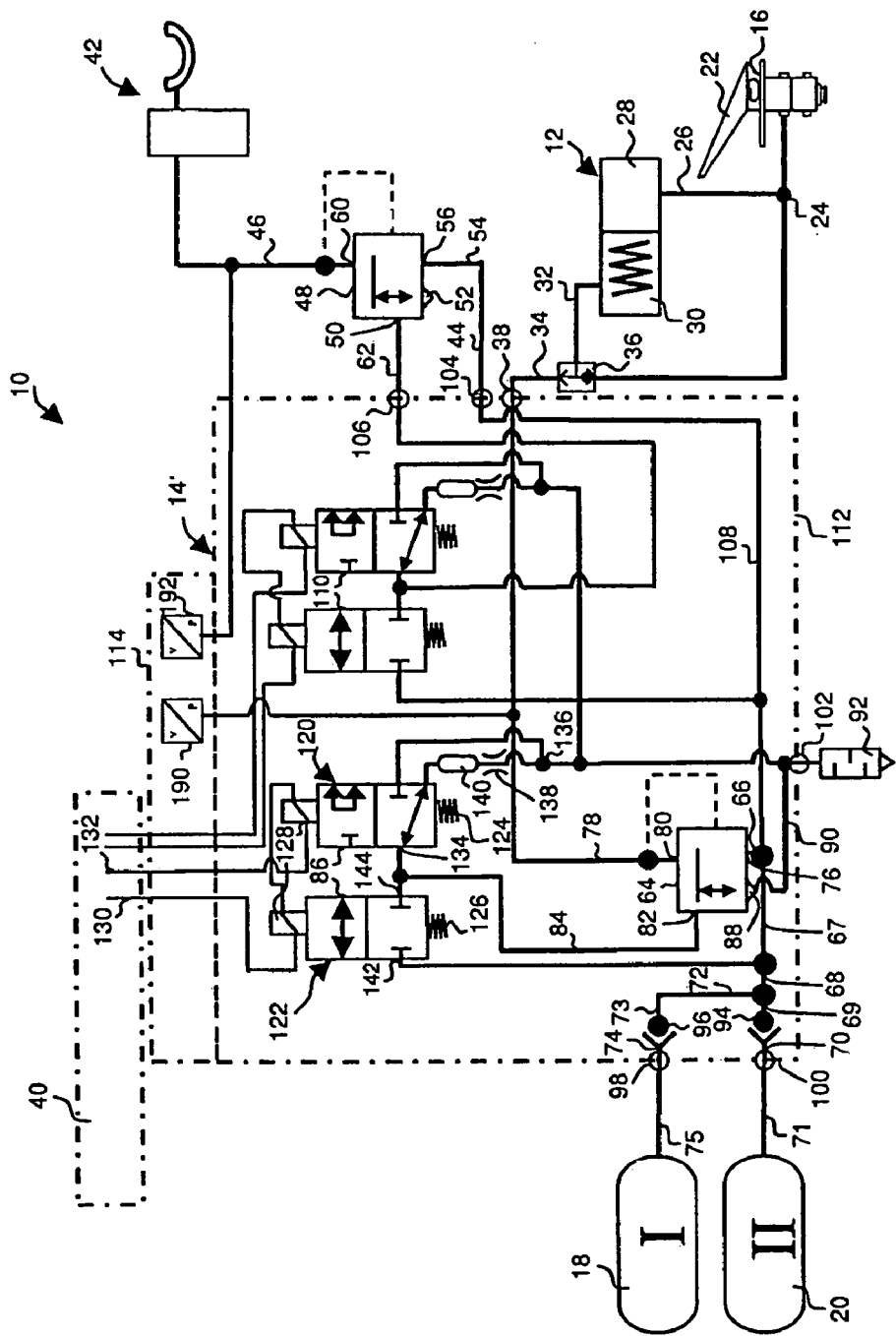
FIG. 3 is a simplified schematic diagram of a section of an air-brake system having an electro-pneumatic brake control device for controlling a parking brake, including a valve unit according to another exemplary embodiment of the present invention for use in commercial vehicles for the North American market with trailers and anti-lock braking systems.

Instead of one pressure sensor 116 for measuring the reservoir pressure or reservoir pressures, parking brake valve unit 14' shown in FIG. 3 is provided with two pressure sensors 190, 192. Pressure sensor 190 measures the modulated pressure at the output of relay valve 64. Pressure sensor 192 measures the modulated pressure at the output of relay valve 48. Pressure sensors 190 and 192 are mounted in cover 114 of parking brake valve unit 14'. Cover 114 has appropriate installation locations for these pressure sensors.

For universal usability of the parking brake valve unit, cover 114 is provided with a plurality of installation locations for pressure sensors. These installation locations can be equipped, as needed, with pressure sensors 116, 190, 192. Depending on how these installation locations are equipped with pressure sensors, either the reservoir pressure of compressed air reservoir tanks 18, 20 can be measured individually or there can be measured the higher of the two reservoir pressures downstream from check valves 94, 96 and/or the respective pressure downstream from either of relay valves 48, 64 or from both relay valves. Preferably, cover 114 is therefore provided with three or four such installation locations for pressure sensors.

Pressure sensors 190, 192 can be placed in communication with electronic control unit 40, as can pressure sensor 116, so that the sensed pressure values can be included in the evaluation.

Figure 4:
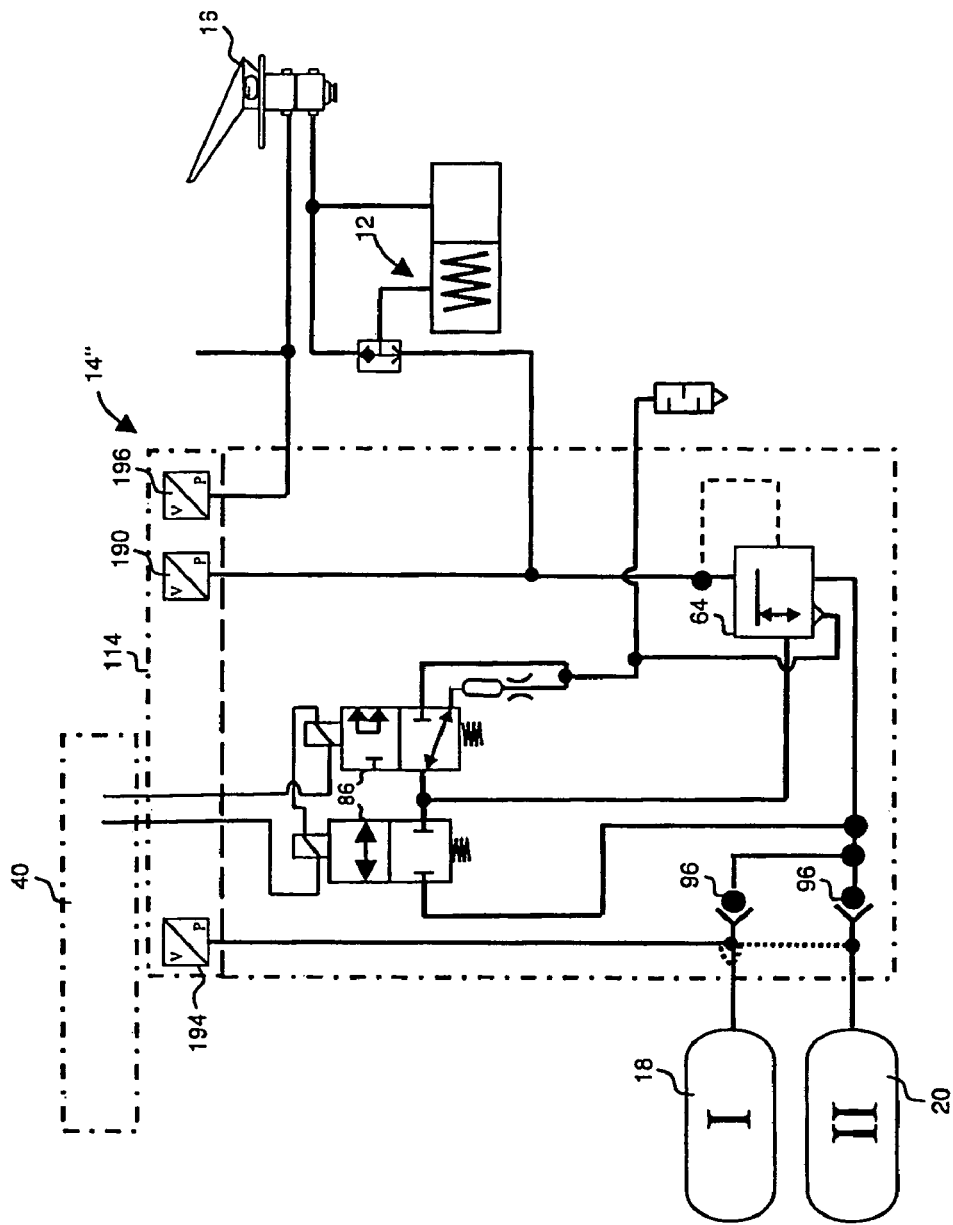
FIG. 4 is a simplified schematic diagram of a section of an air-brake system having an electro-pneumatic brake control device for controlling a parking brake, including a valve unit according to a further exemplary embodiment of the present invention for use in commercial vehicles for the North American market with anti-lock braking systems.

FIG. 4 shows a parking brake valve unit 14" having only one control valve 86 for control of relay valve 64. This configuration is used in vehicles without trailers, such as buses. Compared with FIGS. 1 and 3, therefore, second relay valve 48 is omitted, as is control valve 110 for control of relay valve 48. A plurality of pressure sensors is again provided. Pressure sensor 190 measures the modulated pressure at the output of relay valve 64. Pressure sensor 194 measures the reservoir pressure of compressed air reservoir tank 18 just upstream from check valve 96. Alternatively, however, pressure sensor 194 can also be in communication with the pressure line to compressed air reservoir tank 20, as is indicated by a dashed line in FIG. 4.

A further pressure sensor 196 is provided, which is also disposed in cover 114. A pressure delivered by brake-force transducer 16 is determined by means of pressure sensor 196.

All pressures determined with the foregoing pressure sensors are evaluated in evaluating unit 40 to, in particular, drive control valve 86 for control of relay valve 64 and, thus, of spring-actuated brake cylinders 12.

FIG. 5 shows an exemplary embodiment of a parking brake valve unit 14'''. This configuration is used in vehicles for the European market having a separate compressed air reservoir tank 188 for parking brake circuit III. This configuration—by analogy to the exemplary embodiment of FIG. 4—is used in vehicles without trailers, such as buses. This configuration, therefore, also corresponds largely to the configuration of the exemplary embodiment shown in FIG. 4, with the exception, as already discussed, of a special compressed air reservoir tank 188 for the parking brake. In the exemplary embodiment shown in FIG. 5, cover 114 is equipped with only a single pressure sensor 190, which senses the modulated pressure at the output of relay valve 64. The electronic control unit is also disposed in cover 114 in the exemplary embodiment shown in FIG. 5. For this purpose, cover 114 is provided with an installation location for this control unit.

In an alternative embodiment, the reservoir pressure of compressed air reservoir tank 188 can be also be sensed with a further pressure sensor. All measured pressure values are used by the evaluating electronics for control of control valve 86.

Figure 6:
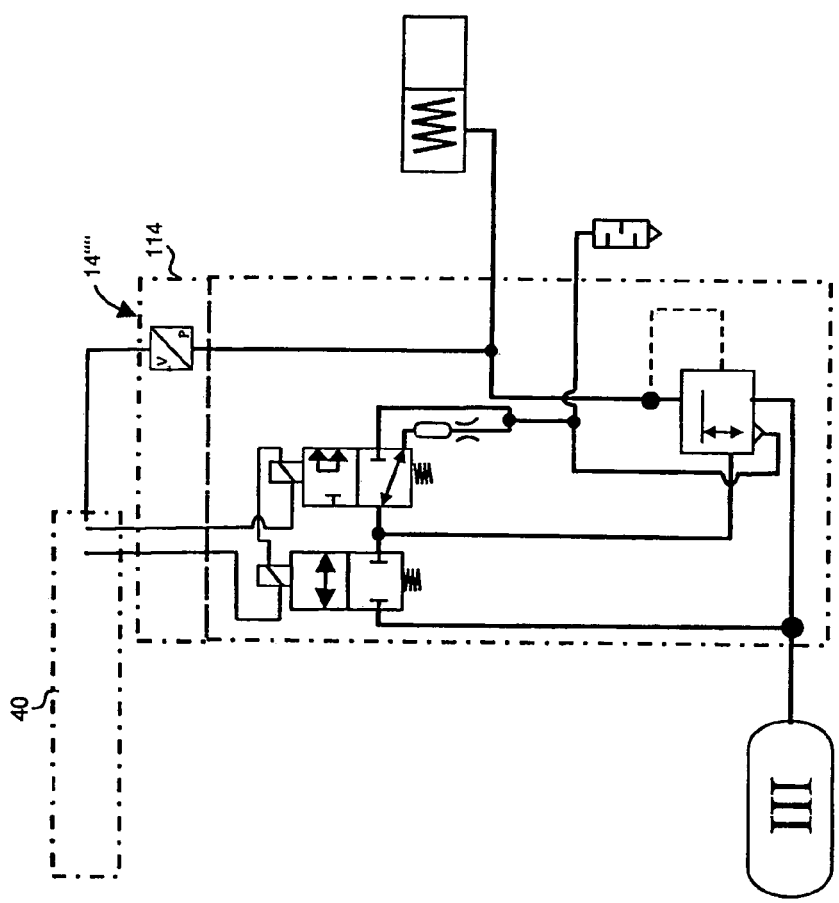
FIG. 6 is a simplified schematic diagram of a section of an air-brake system having an electro-pneumatic brake control device for controlling a parking brake, including a valve unit according to yet another exemplary embodiment of the present invention for use in commercial vehicles for the European market with anti-lock braking systems.

FIG. 6 shows a further exemplary embodiment of a parking brake valve unit 14'''' that corresponds largely to parking brake valve unit 14''' shown in FIG. 5. The only difference, however, is that electronic control unit 40 in valve unit 14'''' shown in FIG. 6 is disposed outside cover 114 and, thus, for example, is integrated in the electronics of the anti-lock braking system of the vehicle.

FIG. 7 shows another exemplary embodiment of a parking brake valve unit 14'''''. This exemplary embodiment corresponds largely to the exemplary embodiment shown in FIG. 5. Compared with the exemplary embodiment shown in FIG. 5, however, parking brake valve unit 14''''' is additionally provided with a further control valve 206 for a trailer checking controller. A trailer checking function can be activated by means of this valve 206. As the trailer checking function, a condition of the brake system is designated in which the brakes of a trailer connected to the tractor are released while the parking brake function itself is engaged in order to give the tractor operator an opportunity to check whether the braking action of the parking brake of the tractor is sufficient alone to prevent the entire vehicle train from rolling away if the vehicle is parked. Such a check is advantageous in particular for trailers the brakes of which could be released, for example, due to gradual pressure loss, if the vehicle train is parked for a prolonged time. In this case, it also must be ensured that the vehicle train will not roll away, and, accordingly, this is effected by the parking brake of the tractor.

Valve 206 is designed as an electromagnetically actuatable 3/2-way solenoid valve, which, for actuation, is connected to the electronic control unit via an electrical line (not illustrated). In a first switched position illustrated in FIG. 7, valve 206 places compressed air line 210 leading to trailer control valve 208 in communication with the output of relay valve 64. In its second switched position, valve 206 places compressed air line 210 in communication with the compressed air reservoir of compressed air reservoir tank 188. The trailer checking function is activated in this second switched position. In the process, the input of trailer control valve 208 is pressurized with the reservoir pressure, thus bringing about release of the trailer brakes by virtue of an inverting function of trailer control valve 208.

In the exemplary embodiment shown in FIG. 7, the electronic control unit is also disposed in cover 114.

Figure 8:
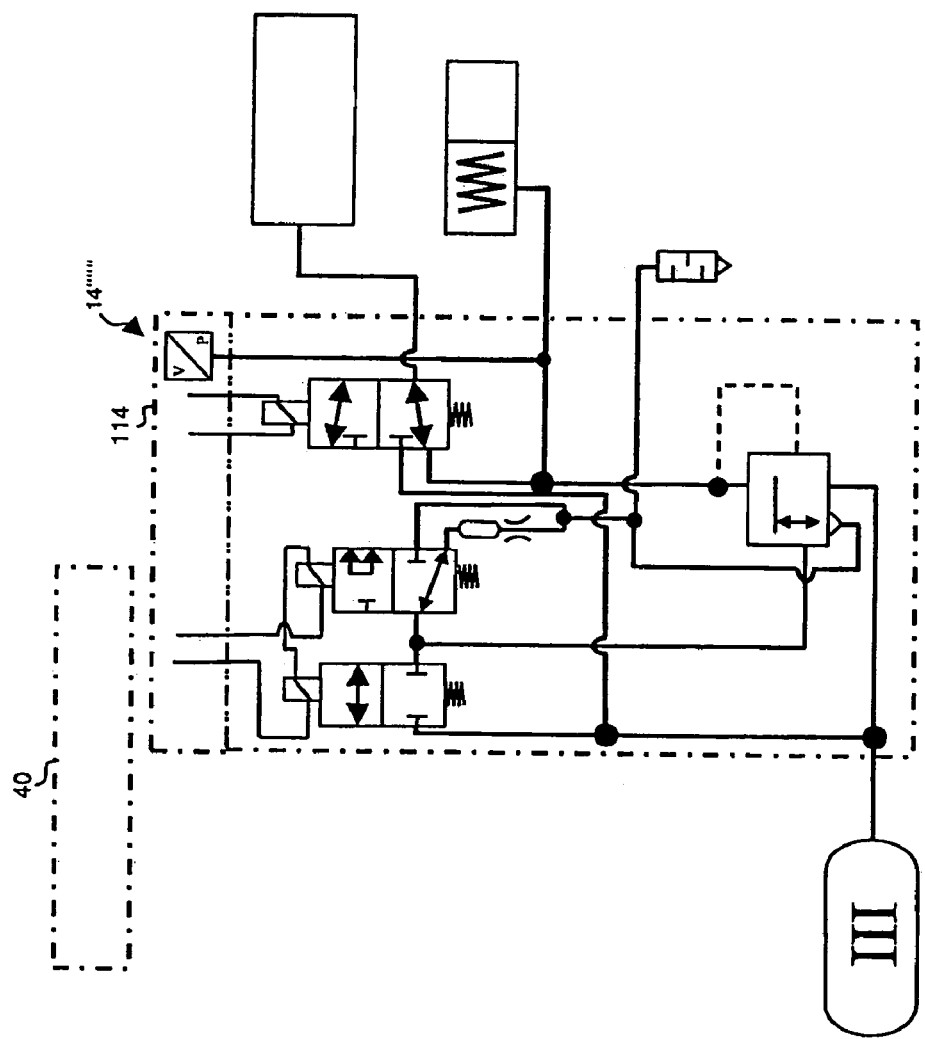
FIG. 8 is a simplified schematic diagram of a section of an air-brake system having an electro-pneumatic brake control device for controlling a parking brake, including a valve unit according to another exemplary embodiment of the present invention for use in commercial vehicles for the European market with trailers and anti-lock braking systems.

In contrast, FIG. 8 shows a further exemplary embodiment of a parking brake valve unit 14'''''', which corresponds largely to the exemplary embodiment shown in FIG. 7, with the exception that electronic control unit 40 is disposed outside cover 114. Electronic control unit 40 is preferably installed in the control unit of the anti-lock braking system.

FIGS. 1 to 4, on the one hand, and FIGS. 5 to 8, on the other hand, show how different valve concepts for the North American market and the European market are proposed in response to different legal and technical regulations. One aspect of the present invention is aimed at unifying these different concepts, so that a uniform valve concept can be provided for an electro-pneumatic parking brake for vehicles of both the North American and European markets, with and without trailers. The valve block of the parking brake valve unit is therefore configured according to the present invention to have one or two reservoir ports. Whereas only one reservoir port for circuit III is used for the European market, two reservoir ports, namely, circuits I and II, are connected for the North American market. These are preferably protected from one another by means of check valves.

A plurality of installation locations for pressure sensors is provided in the cover of the parking brake valve unit. Depending on how the installation locations are configured and equipped with pressure sensors, therefore, each reservoir pressure can be sensed individually or the higher of the two reservoir pressures downstream from the check valves and/or the pressure downstream from either one of the relay valves or from both relay valves can be sensed.

A plurality of installation locations for coils for solenoid valves is also provided in the valve block. For both the European and North American markets, a first coil location for driving a control valve actuates the parking brake of the vehicle.

The second coil is provided for a trailer checking function in the embodiments for the European market. In contrast, in the embodiments for the North American market, the second coil is provided for the trailer.

If the parking brake valve unit is operated in vehicles without trailers, the installation location for the second coil remains unoccupied.

The cover of the parking brake valve unit that can be mounted on the valve block can be provided as needed with a stand-alone electronic control unit having pressure sensors. Alternatively, however, the cover is provided only with one or more sensors in communication with an external electronic control unit. The cover is, therefore, also equipped with a plurality of installations for pressure sensors as well as with one installation location for an electronic control unit.

By virtue of the inventive configuration of the parking brake valve unit, especially of the valve block and cover, the same parking brake valve unit, meaning the same valve block and the same cover, can be used for vehicles of both the North American and European markets, regardless of whether the vehicle is supposed to be operable with or without a trailer.

The present invention accordingly permits a valve concept that can be universally used for different brake systems, for different markets with different legal regulations and for different vehicle configurations. Thus, the corresponding components, especially the valve block and the cover, can be used in several systems. As a result, cost savings are achieved, since only one and the same respective component must be stocked for the different markets and the different vehicle configurations. This ensures cost-efficient implementation of an electro-pneumatic parking brake.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A valve unit for an electro-pneumatic brake control device for controlling a vehicle parking brake, the valve unit comprising a common uniform valve block, at least one air-flow-boosting valve device operable to admit air into and to vent at least one spring-actuated brake cylinder of the parking brake, and at least one electrically actuatable control valve operable to control the air-flow-boosting valve device, said common uniform valve block comprising a housing with a first recess and a second recess, said air-flow-boosting valve device being disposed in said first recess and said at least one control valve being disposed in said second recess, at least one of said first recess and said second recess comprising at least one guide for guiding at least one moveable part of at least one of said at least one air-flow-boosting valve and said at least one electrically actuatable control valve.

2. The valve unit according to claim 1, wherein said valve block has at least one installation location for receiving at least one pressure sensor.

3. The valve unit according to claim 2, wherein said at least one pressure sensor is disposed in a compressed air duct in said valve block and can be placed in communication with at least one compressed air accumulator.

4. The valve unit according to claim 1, further comprising a connection to an electrical control device, said electrical control device being operable to actuate said at least one control valve in controlled manner, said electrical control device being connected to an electrical actuating device, said actuating device including at least one electrical switch having at least one of a released position, engaged position and neutral position for one of releasing and engaging the parking brake.

5. The valve unit according to claim 4, wherein said control device is integrated in a unit spatially separated from said valve unit for controlling an anti-lock braking system.

6. The valve unit according to claim 4, further comprising a cover, said control device being disposed in said cover.

7. The valve unit according to claim 4, wherein said actuating device includes a switch for actuating an anti jackknifing function.

8. The valve unit according to claim 1, wherein said valve block has at least two installation locations for solenoids of said at least one control valve.

9. The valve unit according to claim 8, wherein said valve block has a first installation location for a first solenoid of one of said at least one control valve for actuating the parking brake of a tractor vehicle.

10. The valve unit according to claim 8, wherein said valve block has a second installation location for a second solenoid of another one of said at least one control valve for actuation of the parking brake of a trailer vehicle.

11. The valve unit according to claim 10, wherein said second installation location for said second solenoid is unoccupied.

12. The valve unit according to claim 1, wherein said valve block includes a plurality of ports which can be placed in communication with said at least one compressed air accumulator via compressed air lines.

13. The valve unit according to claim 12, wherein at least one of said plurality of ports is closed.

14. The valve unit according to claim 1, wherein at least one pressure sensor is disposed in a compressed air duct provided in said valve block, said duct leading from an output of said air-flow-boosting valve device in the direction of said spring-actuated brake cylinder.

* * * * *